United States Patent
Fries et al.

[11] Patent Number: 6,120,302
[45] Date of Patent: Sep. 19, 2000

[54] SWITCHING VALVE FOR A MULTIPLE-CIRCUIT VEHICLE BRAKE SYSTEM

[75] Inventors: Ansgar Fries; Otto Vollmer, both of München, Germany

[73] Assignee: Knorr-Bremse Systeme fur Nutzfahrzeuge, Munich, Germany

[21] Appl. No.: 08/847,466
[22] PCT Filed: May 9, 1995
[86] PCT No.: PCT/DE95/00629
§ 371 Date: Apr. 24, 1997
§ 102(e) Date: Apr. 24, 1997
[87] PCT Pub. No.: WO96/12635
PCT Pub. Date: May 2, 1996

[30] Foreign Application Priority Data

Oct. 25, 1994 [DE] Germany ............... 44 38 154

[51] Int. Cl.[7] ............................... F16K 11/07
[52] U.S. Cl. ................. 437/112; 137/312; 137/332
[58] Field of Search ............. 137/112, 113, 137/312, 332; 251/63

[56] References Cited

U.S. PATENT DOCUMENTS

| | | | |
|---|---|---|---|
| 1,849,702 | 3/1932 | Bard | 137/113 |
| 2,124,274 | 7/1938 | Nichols | 137/332 |
| 2,631,001 | 3/1953 | Griswold | 137/312 |
| 4,002,374 | 1/1977 | Horowitz | 303/29 |
| 4,067,348 | 1/1978 | Davis | 251/63 X |
| 4,506,697 | 3/1985 | Marchant | 137/312 |
| 4,711,392 | 12/1987 | Kidouchi et al. | 137/332 X |

FOREIGN PATENT DOCUMENTS

| | | | |
|---|---|---|---|
| 0 422 345 A1 | 8/1990 | European Pat. Off. | B60T 15/20 |
| 0 477 519 A1 | 8/1991 | European Pat. Off. | B60T 13/66 |
| 71 24640 | 2/1973 | France | B60T 15/00 |
| 26 19 901 A1 | 11/1976 | Germany | B60T 15/36 |

OTHER PUBLICATIONS

Wrede et al., Brake by Wire for Commercial Vehicles, SAE International, Warrendale, PA, Nov. 16–19, 1992, pp. 1–11.

*Primary Examiner*—Stephen M. Hepperle
*Attorney, Agent, or Firm*—Senniger, Powers, Leavitt & Roedel

[57] ABSTRACT

A reversing valve for a two-circuit brake system of a motor vehicle is a sliding valve and consists of a housing that has a cylindrical chamber in which a piston is arranged to be movable and is pressed to a limit position by means of a spring. The outer sleeve surface of the piston has at least one recess which, together with the inner wall of the chamber, forms an annular space, which is sealed at both sides with respect to the chamber by means of seals. At least two inlets, and one outlet open into the chamber in such a way that in accordance with the position of the piston, the outlet is in a flow connection with a control inlet.

12 Claims, 6 Drawing Sheets

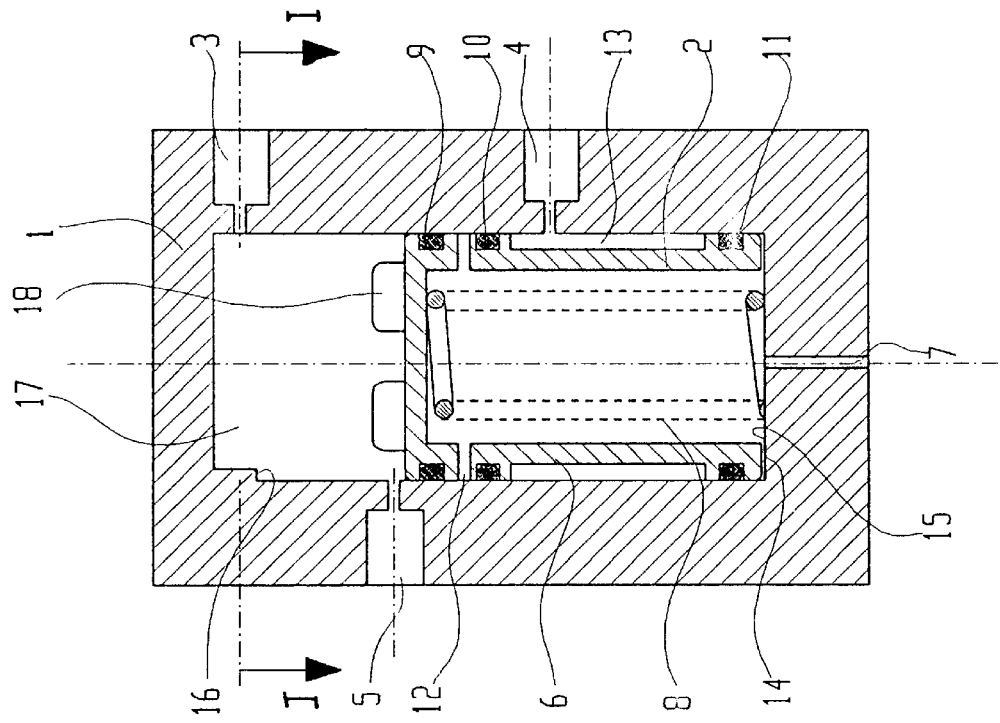
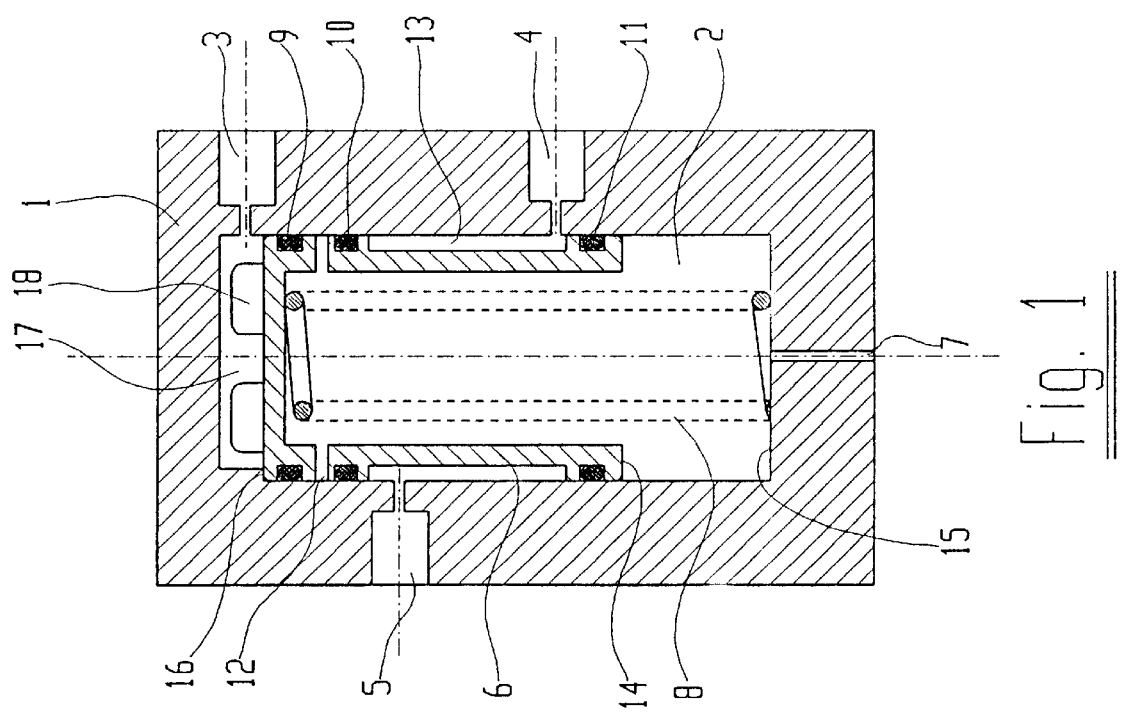

SWITCHING VALVE FOR A MULTIPLE-CIRCUIT VEHICLE BRAKE SYSTEM

BACKGROUND OF THE INVENTION

The invention relates to a reversing valve for a multiple-circuit brake system for a motor vehicle in accordance with the preamble of claim 1.

DE 4,030,361 A1 and the parallel EP O,477,519 A1 describe an electropneumatic brake system that uses a relay valve (9 in the only figure) in order to switch between electrically-controlled and pneumatically-controlled brakes. Generally, with electropneumatic brakes, it must be guaranteed that at least a conventional pneumatic braking function remains fully preserved in the event of the failure of the electrical control or of other electrical components. For this purpose, a driver brake valve has an electrically component, namely, a sensor that scans the position of the brake pedal, and a brake request signal proceeds to the electrical control. Said signal then transmits electrically actuating signals in accordance with preselected parameters to proportional valves, which inject the actual pneumatic brake pressure into the brake cylinder. The driver brake valve also has a purely pneumatic component, which controls brake pressure purely pneumatically, as a function of the position of the brake pedal. The overriding brake circuit is the electrical brake circuit. However, if it fails, there is an automatic reversal to the purely pneumatic brake. The relay valve used in the aforementioned publications for reversal is, in principle, a seat valve, which has a complicated construction and consequently is expensive.

In addition, reversing valves of the aforementioned type also are used in a brake system having two pneumatic brake circuits with the task of, for normal operating conditions, routing the overriding brake circuit to a corresponding actuator, and, for nonstandard operating conditions, routing the secondary brake circuit. Since two brake circuits that are independent of each other are joined in this valve, it must be guaranteed that any possible leakage between the circuits is ventilated to atmospheric pressure. Therefore, in principle, this type of reversing valve can be used:

- at the intersections between two pneumatic brake circuits;
- in an electropneumatic brake system (EBS-systems) where, for the purpose of safety, a pneumatic circuit operates only in the event of the failure of the electrical circuit and
- for use in a pulling vehicle and trailer.

In an paper by Jürgen Wrede and Heinz Decker, "Brake by Wire for Commercial Vehicles", published at the "International Truck and Bus—Meeting and Exposition, Toledo, Ohio, Nov. 16–19, 1992, (published in SAE TECHNICAL PAPER SERIES No. 922,489), an electropneumatic brake system is described on p. 5, for which decoupling of the two pressures of the two circuits is carried out by means of a relay valve having a double seal and a vented inner chamber.

SUMMARY OF THE INVENTION

The purpose of the invention is to create a reversing valve which has a simple construction and operates reliably over a long operating life.

This problem is solved by means of the features indicated in claim 1. Advantageous configurations and improvements of the invention are to be taken from the subclaims.

Generally, a reversing valve in accordance with the invention is conceived as a sliding valve, which enables a very simple construction consisting of a piston with seals, preferably O-rings, a pull-back spring and a housing that comprises several drilled holes. The two circuits are relieved by means of a double seal with an air hole to the outside. Forming a reversing valve as a sliding valve results in a very low switching pressure, since the O-ring seals have only a limited amount of friction. In addition, the switching pressure supplied by the first circuit is practically independent from the pressure prevailing in the second circuit.

Since the double seal slides along a drilled hole of the housing when the valve is shifted, in order to guarantee a decoupling of the two circuits and a venting to the atmosphere, the life of the valve depends on the wear of the double seal. An improvement of the invention consequently provides for the piston of the valve to be provided with wing-like guide blades and for control pressure for reversing the valve to be guided such that a flow pulse impinges on the guide blades and, by this means, rotates the piston somewhat with each operation. The O-rings are also rotated, and consequently, the wear is spread out uniformly over the entire peripheral surface of the O-rings.

In accordance with an additional configuration of the invention, a reversing valve has a separate inlet to which a compressed agent is supplied solely in order to reverse the valve. This is used to guarantee that for each operation of the brakes, a full supply pressure is used for reversal. However, in many cases, the brake pressure which has been injected will suffice for reversing the valve.

BRIEF DESCRIPTION OF THE DRAWINGS

In the following, the invention is explained in greater detail with the aid of embodiments in connection with the figure. Shown are:

FIG. 1: A cross section of a reversing valve in accordance with the invention, in the rest position;

FIG. 2: A cross section of a reversing valve in accordance with the invention, in the working position;

Identical reference numbers in the individual figures denote identical parts or functionally corresponding parts.

DETAILED DESCRIPTION OF THE INVENTION

Figure 3:
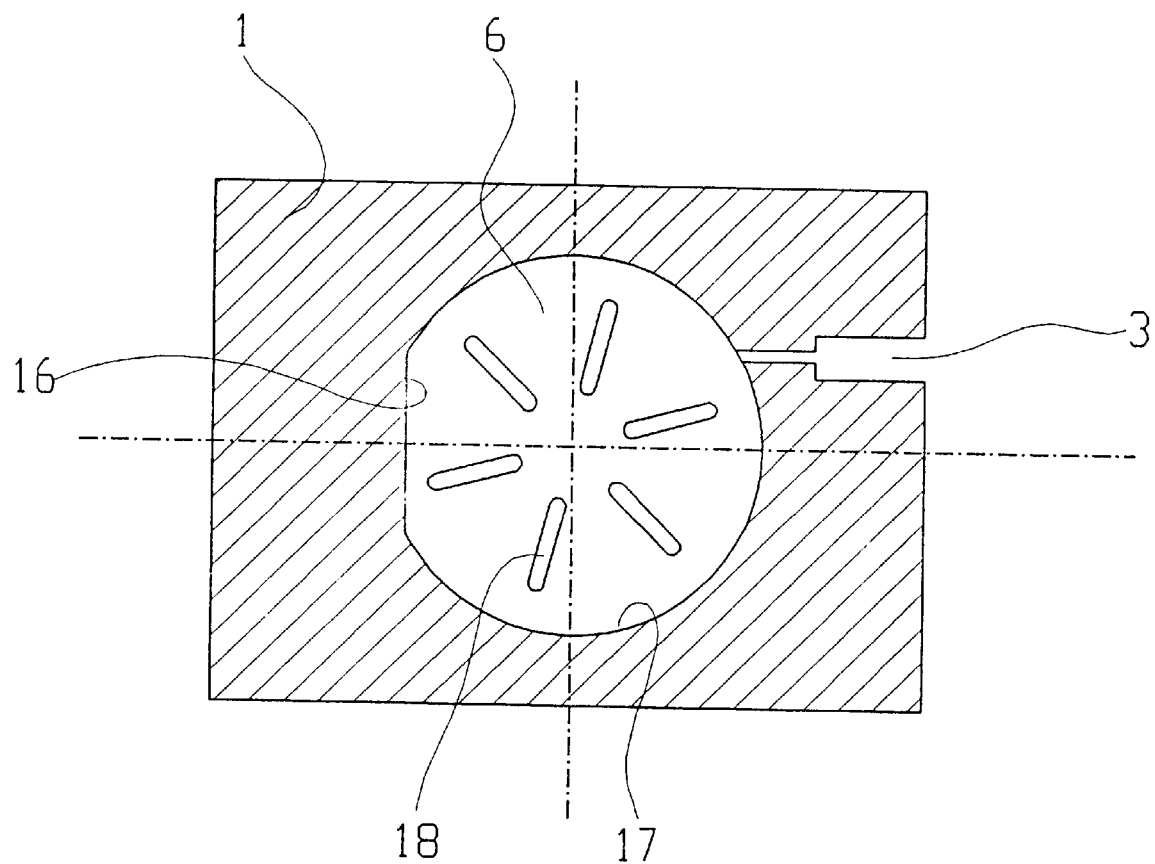
FIG. 3: A section along line I—I of FIG. 2.

First, reference is made to FIG. 1. A reversing valve has a housing (1), the interior of which comprises a cylindrical chamber (2). The housing (1) has a total of four openings to the chamber (2), namely, an inlet (3), a second inlet (4), an outlet (5) and a vent (7). In the embodiment of FIG. 1, openings (4,5) open radially into the chamber (2), while the vent (7) penetrates the housing axially. The opening (3) opens eccentrically into the chamber (2). The openings (3,4,5) are offset to each other in an axial direction. In addition, the openings (4,5) are offset to each other in a peripheral direction. A cylindrical piston (6) is inserted to be movable within the interior of the chamber (2), and is moved into a first limit position by means of a spring (8) (FIG. 1). The outer circumference of the piston (6) is sealed with respect to the inner wall of the chamber (2) by means of three seals (9,10,11) which here are in the form of O-ring seals. The relevant seals are held in annular grooves of the piston (6). The two seals cited first (9,10) are located relatively close to each other. Between them, the piston (6) has several drilled holes (12) through which the interior of the piston, in which the spring (8) is also arranged, is accessible. It is also possible to provide only a single drilled hole (12), which is connected to an annular impression—not represented—on the outer surface of the piston (6), by which it is also guaranteed that for any optional rotational position of the piston (6), its interior space is in a flow connection with the opening (5) if this annular impression is aligned with the opening (5).

Between the seals (10,11), the piston (6) comprises an annular recess which, together with the inner wall of the chamber (2), forms an oblong annular space (13). This annular space therefore is sealed with respect to the chamber (2) by means of the wall of the piston (6) and the seals (10,11).

The piston (6) can be moved in an axial direction within the chamber (2) against the force of a spring (8), until an end (14) of the piston (6) comes to a stop against the base (15) of the chamber (2). Furthermore, the housing (1) has a projection in the interior of the chamber (2), opposite the base (15). Said projection serves as a limit stop (16) against which the piston is pressed by means of the spring (8). In the rest position represented in FIG. 1, the base of the piston (2) is pressed against this limit stop (16), with a second chamber (17), into which the inlet (3) opens, being formed between the piston surface and the opposing housing wall. The inlet (4) opens into the annular space (13) and, in fact, in such a way that for any position of the piston (6), including the two limit positions of FIGS. 1 and 2, the annular space (13) is in constant connection with the inlet (4).

The outlet (5), when viewed in an axial direction, is arranged between the openings (3,4). In the rest position of FIG. 1, it likewise opens into the annular space (13) and consequently is in a flow connection with the inlet (4). In the working position of the piston (FIG. 2), the opening (5), in contrast, opens into the chamber (17) and consequently is in a flow connection with the inlet (3). Therefore, the outlet (5) is connected either to the inlet (4) or inlet (3), in accordance with the position of the piston (2). In contrast, the two inlets (3,4) are constantly separated from each other by means of the seals (9,10), such that the two pressure circuits of the brake system are constantly separate from each other.

If the piston (2) is moved from one position to the other, one of the drilled holes (12) is aligned momentarily with the opening (5), such that the latter is in a flow connection, with the interior space of the piston and consequently with the chamber (2) by means of one of the drilled holes (12). Since the chamber (2) is connected to the atmosphere by means of the vent (7), the opening (5) is connected to the atmosphere during this reversing process, such that a brake circuit connected to this opening is vented, which is explained in further detail with FIGS. 6 and 7.

When the piston (6) moves, the seals (9,10) slide past the relatively sharp edges of the outlet (5). This presents the danger that the O-rings that are used as seals will wear away quickly. In order to extend their life, an improvement of the invention provides for several wings (18), which project into the chamber (17), to be attached to the piston base; the wings [18] cause the piston to rotate when a compressed agent or compressed air flows through the opening (3) into the chamber (17). The O-rings consequently rotate with the piston (6) such that they are always in a different position when sliding over the drilled hole of the outlet (5). Consequently, wear to the O-rings is distributed over their entire outer circumference, increasing the life of the reversing valve. Moreover, the use of O-rings as a seal also is advantageous for the reason that they have a relatively limited amount of friction and consequently the valve will reverse even at relatively low pressure.

FIG. 3 shows even more clearly the arrangement of a wing that serves as a guide blade, as well as showing the projection (16) that serves as a limit stop that limits movement of the piston. It is also to be recognized that the opening (3) is arranged eccentrically to the central axis, in order to impinge upon the wing (18) with a pulse that rotates the piston (6).

Figure 4:
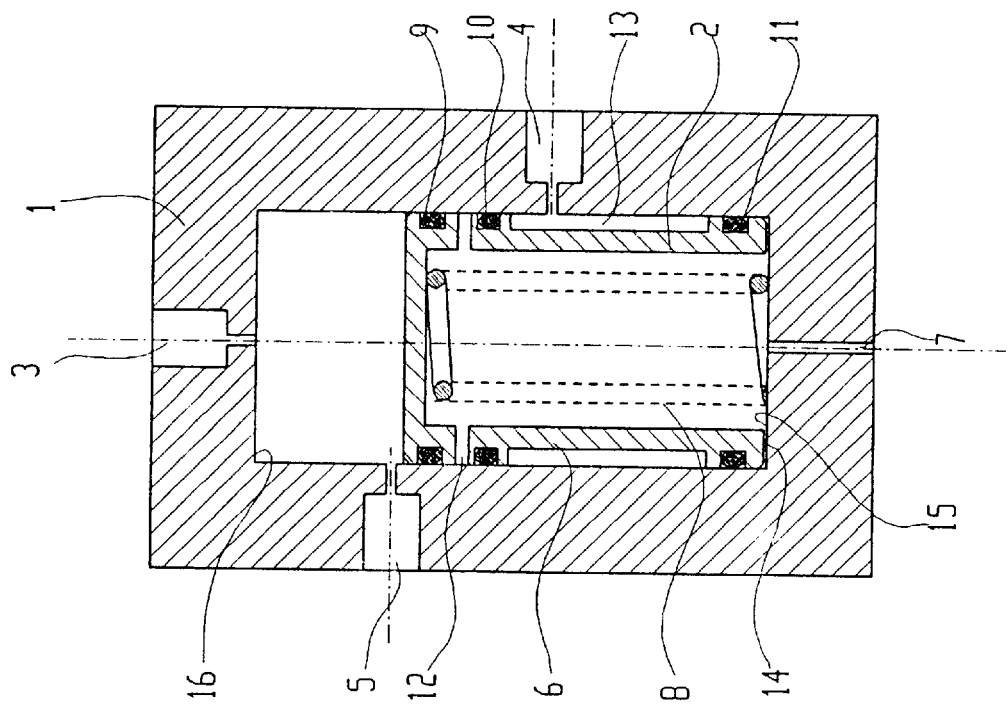
FIG. 4: A cross section similar to FIG. 1, of a reversing valve in the rest position, in accordance with an additional embodiment of the invention.
Figure 5:
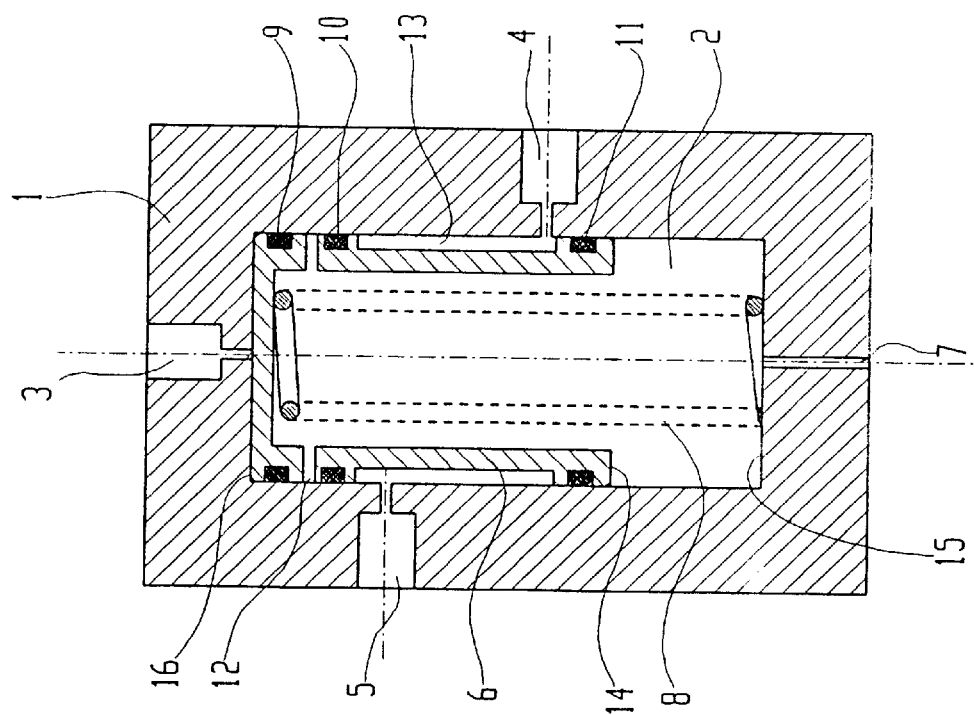
FIG. 5: A cross section of the reversing valve of FIG. 4 in the working position.

The embodiments of FIGS. 4 and 5 differ from those of FIGS. 1 and 2 in that the wings (18) are omitted, so that the overall length of a reversing valve can be shorter. Furthermore, for this embodiment, the inlet (3) is arranged symmetrically to the central axis, i.e., in an axial direction. Otherwise, the embodiments of FIGS. 1 and 2 agree with those of FIGS. 4 and 5.

Figure 6:
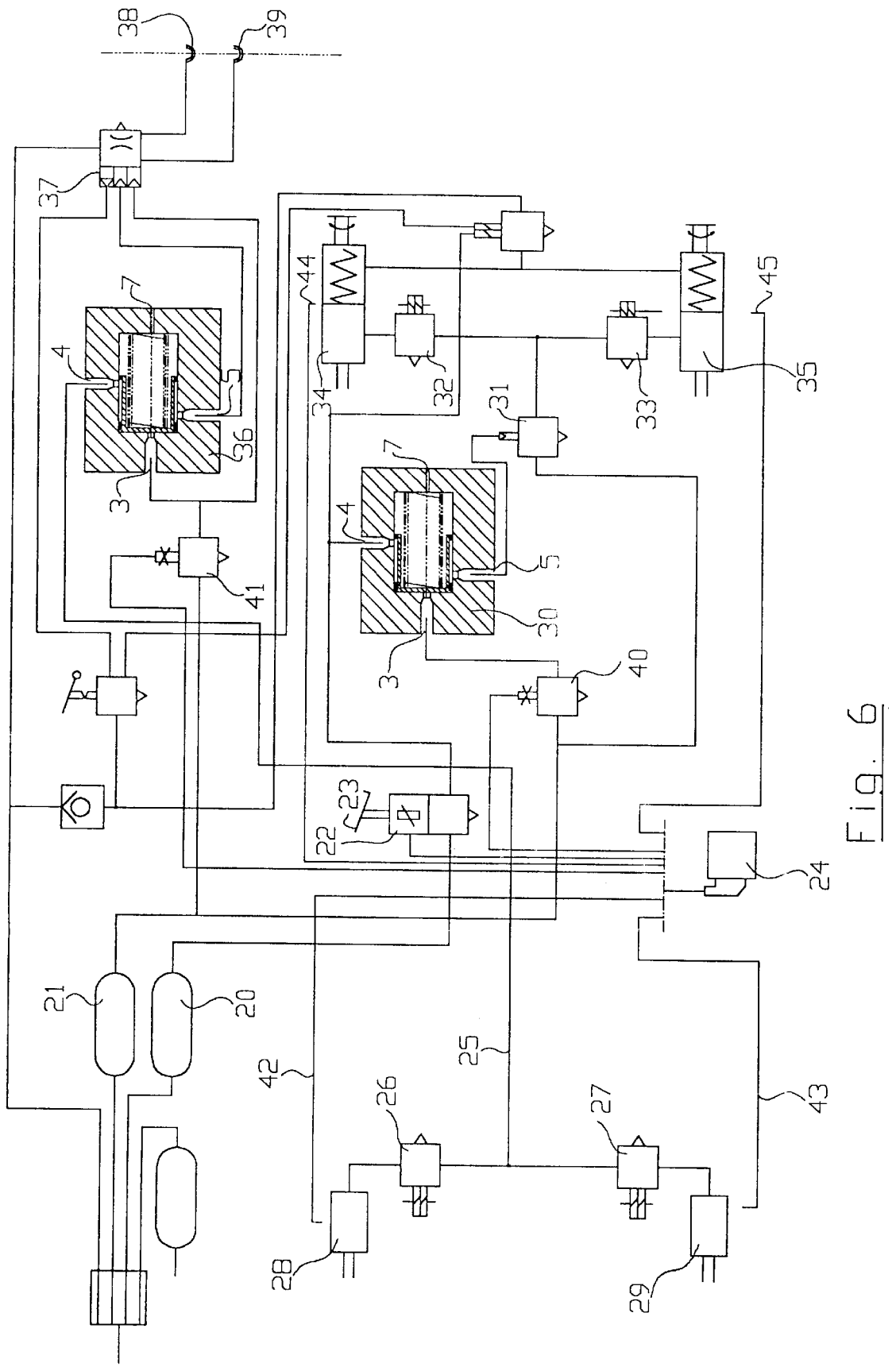
FIG. 6: A block diagram of a two-circuit brake system having two reversing valves in accordance with the invention.

FIG. 6 shows an application of a reversing valve for a two-circuit brake system for a long-haul truck with trailer. The system possesses a first compressed-air reservoir (20) for the front axle circuit and a second compressed-air reservoir (21) for the rear axle circuit. The overriding brake circuit is the front axle circuit. The first compressed-air reservoir (20) is pneumatically connected to a driver brake valve (22), which combines the electrical and pneumatic brake functions. First, the position of the brake pedal (23) is electrically scanned and supplied to an electrical control unit (24). Then, in the event of the failure of the electrical control unit, a brake pressure, which is dependent on the pedal position, is transmitted by means of the pneumatic part of the driver brake valve (22) to a pneumatic line (25), consequently reaching the brake valves (26,27) for the two wheels of the front axle and from there to the brake cylinders, (28,29) which can be operated pneumatically. In addition, this pressure reaches the inlet (4) of a first reversing valve (30), which is designed in accordance with the embodiments described above. In the event that electrical brake has failed, the reversing valve (30) remains in the rest position represented, and the injected pressure reaches from the inlet (4), by means of the annular space, to the outlet (5) and from there to the control input of a relay valve (31). The inlet for the compressed agent of this relay valve (31) is connected to the second compressed-air reservoir for the rear axle; its outlet is connected to brake valves (32,33) for the rear axle brake, which control spring brake cylinders (34,35) for the two wheels of the rear axle.

In a similar way, pressure injected at the driver brake valve reaches the inlet (4) of a second reversing valve (36) for the trailer brakes and, by means of the outlet (5), then reaches a trailer control valve (37), which includes a relay valve and which can be coupled by means of two connections (38,39) to trailers for the vehicle.

If the electrical part of the brake is in order, the electrical control unit (24) delivers a signal corresponding to the brake requirement to an electrically-controlled valve (40), the pneumatic input of which is connected to the second compressed-air reservoir (21) and the pneumatic output of which is connected to the input (3) of the first reversing valve (30). In the same way, the control unit (24) delivers an electrically signal to an electrically-controlled valve (41) for the trailer brake, whose pneumatic input likewise is connected to the second compressed-air reservoir (21) and whole output is connected to the inlet (3) of the second reversing valve (36). Consequently, a pneumatic pressure proportional to the injected brake pressure is present at both inlets (3) of the reversing valves (30,36) and reverses the valves (30,36) to their working positions, i.e., connects the relevant inlet (3) to the outlet. Consequently, for the rear axle, this electrically-controlled pressure reaches the control input of the relay valve (31) and consequently reaches the rear axle brakes. In the same way, this electrically-controlled pressure reaches the trailer control valve (37) by means of the reversing valve (36).

Electrical lines (42,43,44,45) from the electrical control unit to the brake systems of all four wheels indicate that the control unit can also control the separate brakes individually as required, e.g., for an antilock function, in order to control slippage while driving, or for load controlled braking. However, pneumatic pressure is also supplied by the two compressed-air reservoirs (20,21).

For a brake system of this type, it is an important requirement that both circuits remain separate from each other and that pressure injected into one circuit does not reach into the other circuit. The drilled hole (12) described in connection with FIGS. 1–5 is provided for this purpose and guarantees that pressure injected from one circuit to the outlet (5) of the reversing valve does not reach into the other circuit. When a reversing valve is in the rest position, the outlet (5) injects pressure at the inlet (4) that originates from the first compressed-air reservoir (20). In the working position, the opening (5) of the reversing valve (30) injects the pressure prevailing at the inlet (3) and originating from the second compressed-air reservoir (21). By means of the fact that, as the valve is reversed, the drilled hole (12) slides past the outlet (5), the latter is momentarily vented to the atmosphere by means of the vent (7), such that a coupling of pressure from one circuit to the other circuit is avoided.

The additional components represented in FIG. 6 and not addressed in greater detail are conventional components of a two circuit brake system that need no detailed explanation in connection with the present invention.

Figure 7:
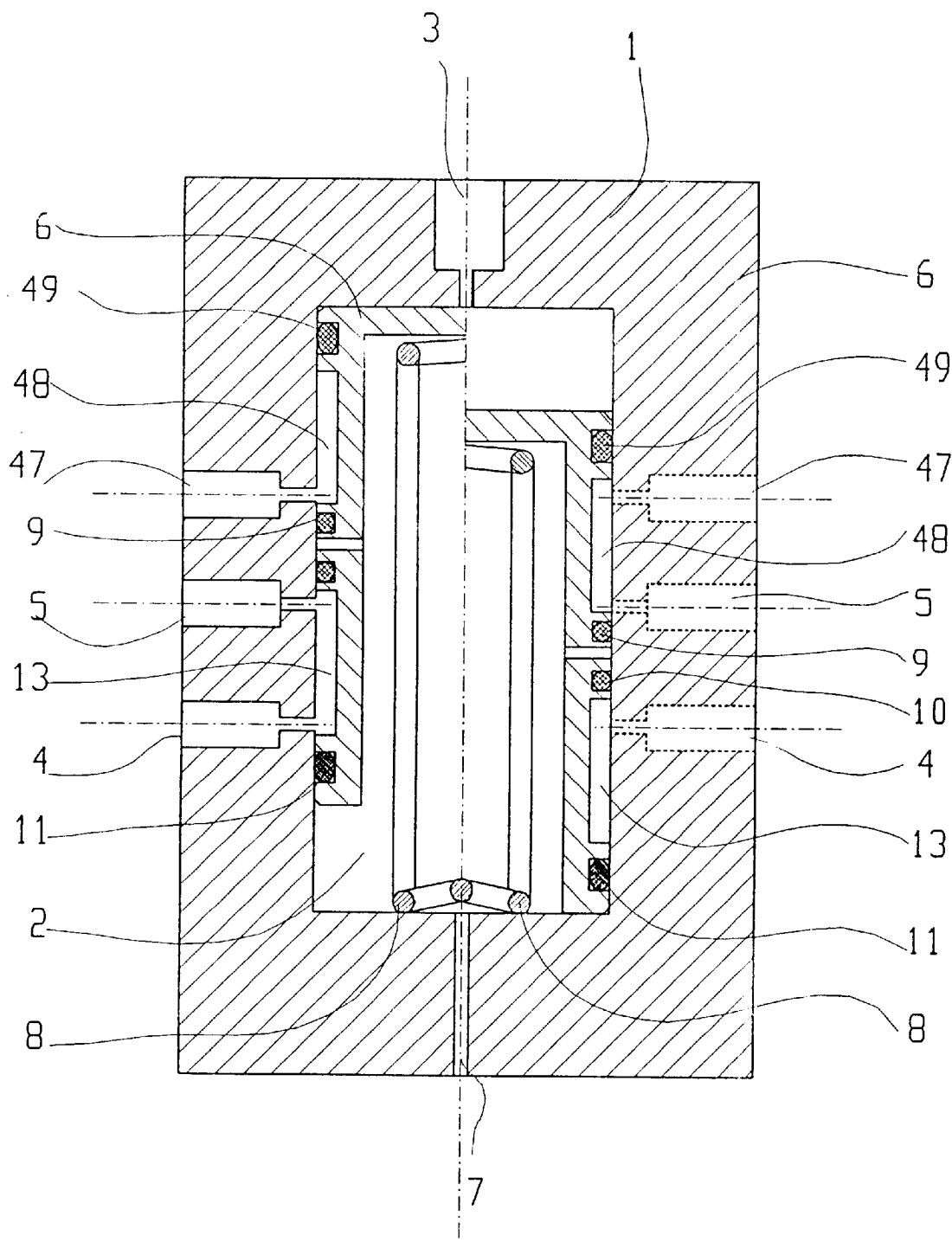
FIG. 7: A cross section of a reversing valve in accordance with an additional configuration of the invention.

FIG. 7 shows a reversing valve in accordance with an additional variation of the invention. The piston (6) is in an rest position in the left section of the figure and in a working position in the right section of the picture. The openings (4, 5, 47) are depicted as dashed lines in the right section of the figure for improved clarity, with reference being made to the fact that these openings are present altogether only once. It is irrelevant to the function of the reversing valve where these three openings are distributed about the outer circumference. It is important only that their distance from each other in an axial direction is selected such that the functionally necessary connections between the openings (5) and (47) or between the openings (5) and (4) will be produced by means of the annular space of the piston.

In comparison with the embodiments of FIGS. 1–5, this reversing valve has yet an additional inlet (47) as will as a piston having two annular spaces (13,48). The inlet (3) serves exclusively in order to supply the compressed agent for reversing the piston but supplies no control pressure whatsoever for the brake cylinder. Rather, control pressure for the brake cylinder is supplied by means of the inlet (47) to the annular space (48), which, when the valve is reversed, connects the inlet (47) to the outlet (5). When the reversing valve is in the rest position, the inlet (4) and outlet (5) are connected to each other by means of the annular space (13). The drilled hole (12) also slides past the outlet (5) during switching in order to guarantee a momentary venting to the atmosphere. The annular space (48) is sealed by means of the seal (9) and an additional seal (49). The annular space (13) is sealed by means of the two seals (10,11). The drilled hole (12) is located between the seals (9,10). Guide blades also can be present for this reversing valve, in correspondence with the embodiment of FIGS. 1–3, and cause the valve piston (6) to rotate somewhat in the working position with each reversal. In this case, the inlet (3) would have to be laid out likewise in order for the compressed agent to flow in essentially eccentrically, transverse to the longitudinal axis and to impinge on the wings with a pressure pulse.

Figure 8:
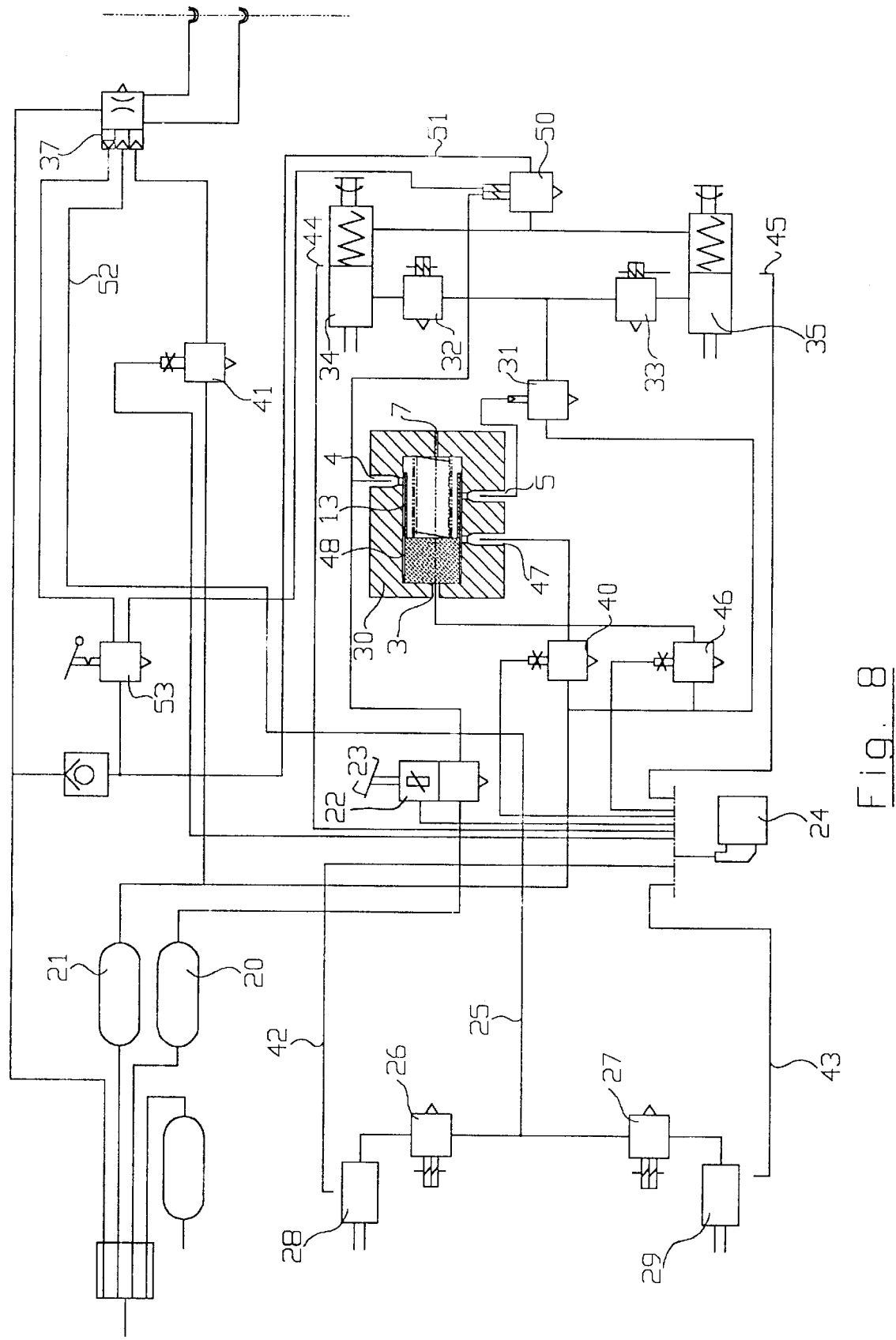
FIG. 8: A block diagram of a two-circuit brake system in a different configuration, having one reversing valve in accordance with the invention.

FIG. 8 shows a two-circuit brake system having a reversing valve in accordance with the embodiment of FIG. 7. The inlet (3) of the reversing valve (30) is impinged upon by the full pressure of the second compressed-air reservoir (21) by means of a reversing solenoid valve (46), which is operated by the electrical control unit (24). Therefore, as soon as the brake pedal (23) is operated and the electrical control (24) recognizes this, the full supply pressure is used in order to reverse the reversing valve rather than only the braking pressure that has been injected, as for the embodiment of FIG. 6. Instead, the latter is supplied to the inlet (47) by means of the proportional valve (40) controlled by the electrical control unit (24). If the reversing valve is actively operated, then braking pressure injected by means of the proportional valve (40) reaches the outlet (5) by means of the inlet (47) and annular space (48) and from there by means of the relay valve (31) to the rear axle brakes.

If, in contrast, the electrical brake is defective, the reversing valve remains in the rest position, and pressure injected pneumatically from the driver brake valve (22) reaches the relay valve (31) by means of the inlet (4), annular space (13) and outlet (5) and from there reaches the rear axle brakes. In the embodiment of FIG. 8, no additional reversing valve is used for the trailer brake. In lieu of this, only an electrically-controlled proportional valve (41) is provided, which, for a functioning electrical brake, guides injected pressure to the trailer control valve (37). If, in contrast, the electrical brake has failed, then pressure that has been injected into the pneumatic line (25) is supplied by means of a line (52) to the trailer control valve (37) and from there to the trailer brake. The proportional valve (41) therefore can only cause a pressure increase in comparison to the pressure appearing on the line (52). As with the embodiment of FIG. 6, a parking brake is also provided and, in fact, by means of an operating valve (53), that delivers pressure for a rear axle parking brake valve (50) as well as to the trailer control valve (37).

We claim:

1. A switching valve for a multiple-circuit brake system of a motor vehicle, the valve comprising:
   a control inlet to which a compressed agent can be supplied in order to reverse the reversing valve;
   an inlet and outlet which are a function of the switching position of the valve, connected pneumatically to each other or pneumatically separated from each other;
   the switching valve being in the form of a sliding valve and comprising a piston which is movable within a chamber of a housing and which can be brought to a rest position by means of a spring;
   the outer circumference of the piston comprising a recess that is sealed at both sides in an axial direction and which together with the inner wall of the chamber forms an annular space, the axial length of which annular space and the axial off set of the inlet and outlet are selected such that when the piston is in the rest position, the inlet and outlet are in a flow connection with each other by means of the annular space;

the control inlet to the chamber is provided such that the surface of the piston can be impinged on with a compressed agent and is arranged with respect to the outlet in an axial direction such that, in the rest position of the piston, the inlet and the outlet are separated from each other and in the working position of the piston are in a flow connection with each other; and the piston comprises at least one drilled hole which is sealed with respect to the inner wall of the chamber in both axial directions, said hole being arranged in such axial position that for a movement of the piston from the rest position to the working position and back, it is aligned with the outlet.

2. The switching valve of claim 1 wherein there are at least two drilled holes in the piston which are sealed with respect to the inner wall of the chamber in both axial directions, said holes being arranged in such axial position that for a movement of the piston from the rest position to the working position and back, the holes are aligned with the outlet.

3. A switching valve as set forth in claim 1 further comprising a plurality of O-rings positioned between the piston and the inner wall of the chamber.

4. A switching valve as set forth in claim 1 further comprising a plurality of vanes extending from one end of the piston, wherein the control port enters the chamber eccentrically so that fluid entering the chamber through the control port impinges the vanes, thereby causing the piston to rotate within the chamber.

5. A switching valve as set forth in claim 4 further comprising a stop projecting into the chamber for limiting travel of the piston within the chamber to prevent the vanes from contacting an end wall of the chamber.

6. A switching valve as set forth in claim wherein:
said recess is a first recess and the piston has a second recess axially offset from said first recess;
said inlet is a first inlet and the chamber has a second inlet extending through the body into the chamber and axially spaced from said first inlet; and
said second inlet communicates with the outlet by way of said second recess when the piston is in the working position.

7. A switching valve for switching between fluid circuits of a multiple-circuit system, the valve comprising:
a hollow body having an inner wall defining a cylindrical chamber, the chamber having an inlet, an outlet, a vent port, and a control port extending through the body and entering the chamber at separate axial positions along the chamber, the control port entering the chamber adjacent one end thereof; and
a cylindrical piston having a neck positioned between two lands slidably received within the chamber and being moveable in response to fluid pressure applied to the control port between a working position in which the neck is out of registration with at least one of the inlet and the outlet to prevent fluid communication between the inlet and the outlet and an off position in which the neck is in registration with both of the inlet and the outlet to permit fluid communication between the inlet and the outlet by way of the neck; and a hole extending through the piston which aligns with the outlet as the piston moves between the off position and the working position to permit fluid communication between the outlet and the vent port to pneumatically decouple the inlet and control port; and
an O-ring encircling the piston at each of said two lands adjacent the neck.

8. A switching valve for switching between fluid circuits of a multiple-circuit system, the valve comprising:
a hollow body having an inner wall defining a cylindrical chamber, the chamber having an inlet, an outlet, and a control port extending through the body and entering the chamber at separate axial positions along the chamber, the control port entering the chamber adjacent one end thereof; and
a cylindrical piston having a neck positioned between two lands slidably received within the chamber and being moveable in response to fluid pressure applied to the control port between a working position in which the neck is out of registration with at least one of the inlet and the outlet to prevent fluid communication between the inlet and the outlet and an off position in which the neck is in registration with both of the inlet and the outlet to permit fluid communication between the inlet and the outlet by way of the neck; and
an O-ring encircling the piston at each of said two lands adjacent the neck; and
a plurality of vanes extending from one end of the piston, wherein the control port enters the chamber eccentrically so that fluid entering the chamber through the control port impinges the vanes, thereby causing the piston to rotate within the chamber.

9. A switching valve as set forth in claim 8 further comprising a stop projecting into the chamber for limiting travel of the piston within the chamber to prevent the vanes from contacting an end wall of the chamber.

10. A switching valve for switching between fluid circuits of a multiple-circuit system, the valve comprising:
a hollow body having an inner wall defining a cylindrical chamber, the chamber having a first inlet, an outlet, a second inlet extending through the body into the chamber at a position axially spaced from the first inlet such that the second inlet is positioned on an opposite side of the outlet from the first inlet and a control port extending through the body and entering the chamber at separate axial positions along the chamber, the control port entering the chamber adjacent one end thereof; and
a cylindrical piston having:
a first neck positioned between two lands slidably received within the chamber and being moveable in response to fluid pressure applied to the control port between a working position in which the first neck is out of registration with at least one of the first inlet and the outlet to prevent fluid communication between the first inlet and the outlet and an off position in which the first neck is in registration with both of the first inlet and the outlet to permit fluid communication between the first inlet and the outlet by way of the neck; and
a second neck axially offset from the first neck such that when the piston is in the working position the second neck is in registration with the second inlet and the outlet to permit fluid communication between the second inlet and the outlet by way of the second neck and when the piston is in the working position the second neck is out of registration with at least one of the second inlet and the outlet to prevent fluid communication between the second inlet and the outlet.

11. A switching valve as set forth in claim 10 wherein the body includes a vent port and the piston includes a hole extending through piston between said first and second necks which aligns with the outlet as the piston moves between the off and working positions to permit fluid communication between the outlet and the vent port to pneumatically decouple said first and second inlets.

12. A switching valve as set forth in claim 11 further comprising an O-ring encircling the piston at each end of said first and second necks.

* * * * *